(12) United States Patent
Fairbanks

(10) Patent No.: US 9,783,983 B1
(45) Date of Patent: Oct. 10, 2017

(54) LOTUS DOME

(71) Applicant: Richard Fairbanks, Torrey, UT (US)

(72) Inventor: Richard Fairbanks, Torrey, UT (US)

(73) Assignee: Richard Fairbanks, Torrey, UT (US)

( * ) Notice: Subject to any disclaimer, the term of this patent is extended or adjusted under 35 U.S.C. 154(b) by 0 days.

(21) Appl. No.: 15/180,299

(22) Filed: Jun. 13, 2016

(51) Int. Cl.
| | | |
|---|---|---|
| *E04B 7/10* | (2006.01) | |
| *E04B 1/32* | (2006.01) | |
| *E04B 1/343* | (2006.01) | |
| *E04C 2/54* | (2006.01) | |
| *E04D 3/06* | (2006.01) | |
| *E04H 7/00* | (2006.01) | |
| *E04H 3/30* | (2006.01) | |
| *F24B 1/181* | (2006.01) | |
| *F24F 7/00* | (2006.01) | |

(52) U.S. Cl.
CPC ............ *E04B 7/102* (2013.01); *E04B 1/3211* (2013.01); *E04B 1/34321* (2013.01); *E04B 1/34384* (2013.01); *E04C 2/54* (2013.01); *E04D 3/06* (2013.01); *E04H 3/30* (2013.01); *E04H 7/00* (2013.01); *F24B 1/181* (2013.01); *F24F 7/00* (2013.01)

(58) Field of Classification Search
CPC .... E04B 7/102; E04B 1/3211; E04B 1/34321; E04B 1/34384; E04C 2/54; E04D 3/06; E04H 3/30; E04H 7/00; F24B 1/181; F24F 7/00
USPC ........... 52/80.1, 80.2, 81.1, 81.2, 81.3, 81.4, 52/81.5, 81.6
See application file for complete search history.

(56) References Cited

U.S. PATENT DOCUMENTS

| | | | | |
|---|---|---|---|---|
| 2,582,723 | A * | 1/1952 | Stemmons | ............. E04B 7/102 52/465 |
| 3,543,455 | A * | 12/1970 | Walsh | ...................... E04H 6/44 52/236.1 |
| 3,675,380 | A | 7/1972 | Moss | |
| 3,683,427 | A | 8/1972 | Burkholz | |
| 3,763,608 | A | 10/1973 | Chamlee | |
| 3,802,132 | A | 4/1974 | Sumner | |
| 3,872,634 | A * | 3/1975 | Seaman | ................. E04H 15/18 52/222 |
| 3,999,337 | A * | 12/1976 | Tomassetti, Jr. | ...... E04B 1/3211 454/334 |
| 4,068,422 | A | 1/1978 | Sumner | |
| 4,203,265 | A * | 5/1980 | Ivers | .................... E04B 1/3211 52/81.3 |
| 4,227,047 | A * | 10/1980 | Horne | ...................... H04R 5/02 381/182 |

(Continued)

OTHER PUBLICATIONS

Brochure from lotusdome.com, retreived 2016, titled "15_180_299 LotusDomeBrochure 8_24_99" available at least as early as Aug. 24, 1999.*

*Primary Examiner* — Charles A Fox
*Assistant Examiner* — Joseph J Sadlon

(57) ABSTRACT

The present invention provides a method for prefabricating, transporting, and rapidly assembling a portable, rigid, dome-shaped structure, with the structural integrity to enable the suspension of extensive hardware and supplies. Said structure would be shaped for acoustic purposes, extremely durable, and allow for extensive climate control. Said structure would be able to be fabricated in a wide range of sizes and shipped to remote locations.

1 Claim, 24 Drawing Sheets
(1 of 24 Drawing Sheet(s) Filed in Color)

(56) References Cited

U.S. PATENT DOCUMENTS

| | | | | |
|---|---|---|---|---|
| 4,228,788 | A | 10/1980 | Moeser | |
| 4,241,746 | A * | 12/1980 | Rothe | E04B 1/32 135/147 |
| 4,285,609 | A * | 8/1981 | Runyon | E04B 1/19 403/172 |
| 4,297,814 | A * | 11/1981 | Tomassetti, Jr. | E04B 1/3211 52/81.4 |
| 4,332,116 | A | 6/1982 | Buchanan | |
| 4,400,927 | A | 8/1983 | Wolde-Tinase | |
| D275,795 | S | 10/1984 | Fraioli | |
| D279,711 | S | 7/1985 | English | |
| 4,583,330 | A * | 4/1986 | Huang | E04B 1/32 403/172 |
| 4,642,949 | A | 2/1987 | Hopper | |
| 4,663,898 | A | 5/1987 | Yacaboni | |
| 4,686,804 | A * | 8/1987 | Smith | E21D 11/00 109/1 S |
| 4,720,947 | A | 1/1988 | Yacaboni | |
| 4,932,169 | A * | 6/1990 | Charbonneau | E04H 15/20 135/99 |
| 4,945,693 | A | 8/1990 | Cooley | |
| 4,979,869 | A * | 12/1990 | Mullin, Jr. | E04H 6/00 414/263 |
| 5,050,354 | A * | 9/1991 | Vendramini | E04B 1/3211 52/309.15 |
| 5,313,763 | A | 5/1994 | Oram | |
| 5,341,610 | A | 8/1994 | Moss | |
| D363,993 | S * | 11/1995 | Johnson | D25/16 |
| 5,525,766 | A * | 6/1996 | Atcheson | G10K 11/20 160/135 |
| 5,628,154 | A | 5/1997 | Gavette | |
| 5,724,775 | A | 3/1998 | Zobel, Jr. | |
| D396,115 | S | 7/1998 | Zobel, Jr. | |
| 5,867,948 | A * | 2/1999 | Liu | E04B 1/3205 52/656.9 |
| 6,202,365 | B1 * | 3/2001 | Provitola | E04B 1/32 52/80.1 |
| 6,276,095 | B1 | 8/2001 | Tripsianes | |
| 6,874,285 | B2 | 4/2005 | Wilson | |
| 7,152,384 | B1 | 12/2006 | McCarty | |
| D572,370 | S | 7/2008 | Boston | |
| 7,458,186 | B2 | 12/2008 | Carter | |
| 7,591,108 | B2 | 9/2009 | Tuczek | |
| 7,600,608 | B2 * | 10/2009 | Freiheit | E04B 1/8236 181/287 |
| 7,765,746 | B2 | 8/2010 | Reed | |
| D629,917 | S * | 12/2010 | Kitagawa | D25/35 |
| 7,900,405 | B1 | 3/2011 | Jacoby | |
| 8,307,605 | B2 | 11/2012 | McCarty | |
| 8,371,073 | B2 | 2/2013 | Fuller | |
| 8,381,456 | B2 * | 2/2013 | Ellen | E04B 7/105 52/639 |
| 8,429,858 | B1 * | 4/2013 | Robinson | E04H 1/005 135/159 |
| 8,646,221 | B2 | 2/2014 | Nelson | |
| 8,736,938 | B1 * | 5/2014 | Schlam | E06B 3/00 359/230 |
| 8,789,318 | B1 | 7/2014 | Sun | |
| 9,217,257 | B2 | 12/2015 | Kestermann | |
| 2009/0272043 | A1 * | 11/2009 | Zwern | E04B 1/34321 52/27 |

\* cited by examiner

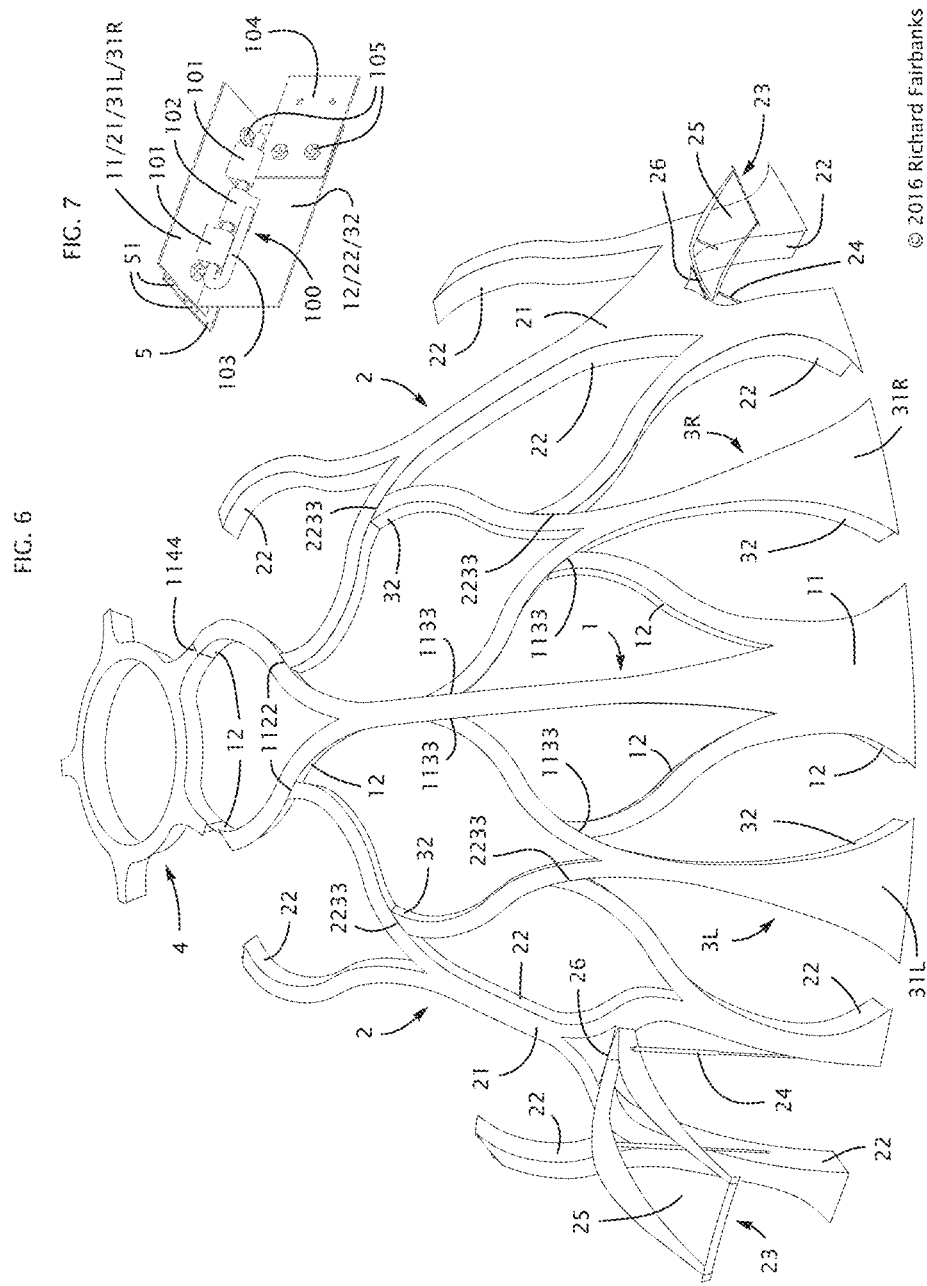

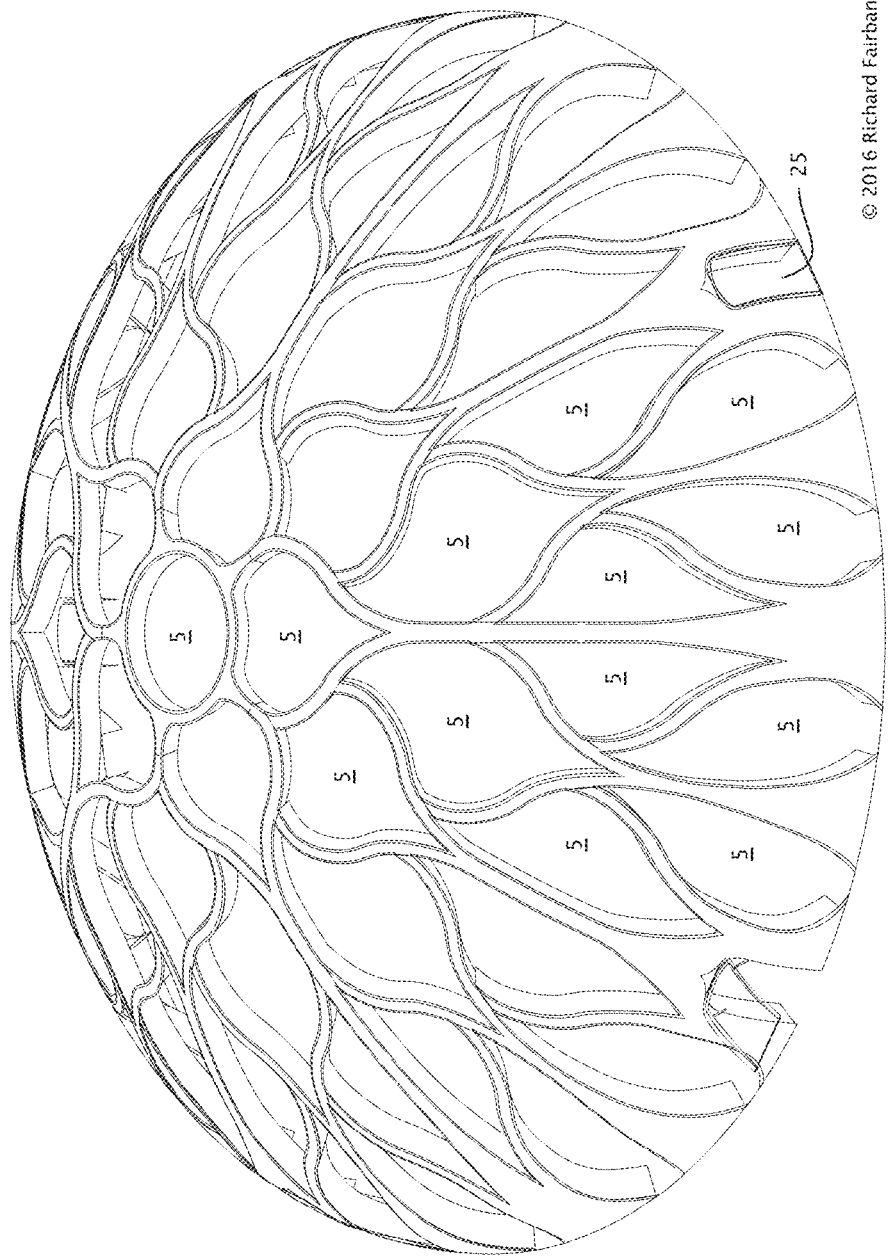

LOTUS DOME

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention ("Lotus Dome") pertains generally to the fabrication, transportation, and use of portable, rigid, dome-shaped structures.

Description of Related Art Including Information Disclosed Under 37 CFR 1.97 and 1.98

In my searches, I have found no teaching, suggestion, or motivation to combine elements of any such related structures, such that would result in this invention.

BRIEF SUMMARY OF THE INVENTION

The Lotus Dome is a dome-shaped structure that is prefabricated, modular, and portable, to reduce cost and enable ease of shipping and rapid assembly in the most extreme of remote locations, as set forth in this disclosure.

The Lotus Dome comprises a framework of rigid, prestressed, three-dimensional, load-bearing truss members ("ribs"), wherein the components of each rib are prefabricated as separate parts, shipped to a site, joined together to form each rib, erected, and secured to each adjacent rib, to form a rigid, freestanding structure, capable of supporting and/or suspending a wide variety of loads upon and/or within said structure. Said structure can then be dismantled, relocated, and again joined together, erected, and secured in a similar manner.

The Lotus Dome is intended to serve as a portable, rapidly assembled, touring performance and gathering facility. It is also intended to serve many other uses, both temporary and permanent, as an enclosed space for human, animal, and plant, activity and habitation, including (for example, but not limited to) serving as a chapel, as a wilderness shelter, a greenhouse, and as living quarters.

The Lotus Dome is designed to be able to be completely self-sustaining, allowing it to be used as a performance and broadcast facility in very remote locations, with zero impact upon the land, and has been engineered to be available in a range of sizes, from 9.14 meters (thirty feet) in diameter to 27.43 meters (ninety feet) in diameter. Other sizes are possible, and can be expected.

The Lotus Dome is intended to inspire an atmosphere of serene exuberance and to demonstrate that structures can exist harmoniously on the planet, nurturing and protecting all lands and life forms.

BRIEF DESCRIPTION OF THE SEVERAL VIEWS OF THE DRAWINGS

This patent or application file contains one drawing executed in grayscale (FIG. 5). Copies of this patent or patent application publication with said drawing will be provided by the Office upon request and payment of the necessary fee.

FIG. 6 demonstrates the symmetry of the various sizes of the Lotus Dome. Shown on the left is a Door Rib as part of a thirty-foot diameter Lotus Dome, and on the right is shown a Door Rib as part of a ninety-foot diameter Lotus Dome. The Main Rib and the matching pair of Support Ribs remain the same in proportion, regardless of scale. The fabrication and assembly procedures are the same for the various sizes, only the shape of the Door Ribs changes.

FIG. 7 demonstrates the preferred embodiment in which the faces of each of the ribs may be pinned together, through a set of three sleeves welded to each of a rib's vertical faces (the rib's "structural web members") and to the interior side of the rib's exterior surface. Shown is an example of a rib's exterior surface (top) joined to one of its two vertical structural web members. A mounting plate for securing the ribs to each other, and to a foundation, is shown bolted to said vertical structural web member, and a part of a window is shown bolted to said rib's exterior surface with two rows of gaskets between the window and the exterior surface.

FIG. 8 is a view of a ninety-foot diameter Lotus Dome, including the windows and the gull-wing doors.

DETAILED DESCRIPTION OF THE INVENTION

Opening Description

The Lotus Dome is a dome-shaped structure that is prefabricated, modular, and portable, to reduce cost and enable ease of shipping and rapid assembly in the most extreme of remote locations. No such structure exists that can ship in such a compact manner, be assembled as rapidly, and be as structurally strong as a Lotus Dome. Those skilled in technical production in the touring aspects of the performing arts will be familiar with such a process.

Overview of the First Five Renderings

Figure 1:
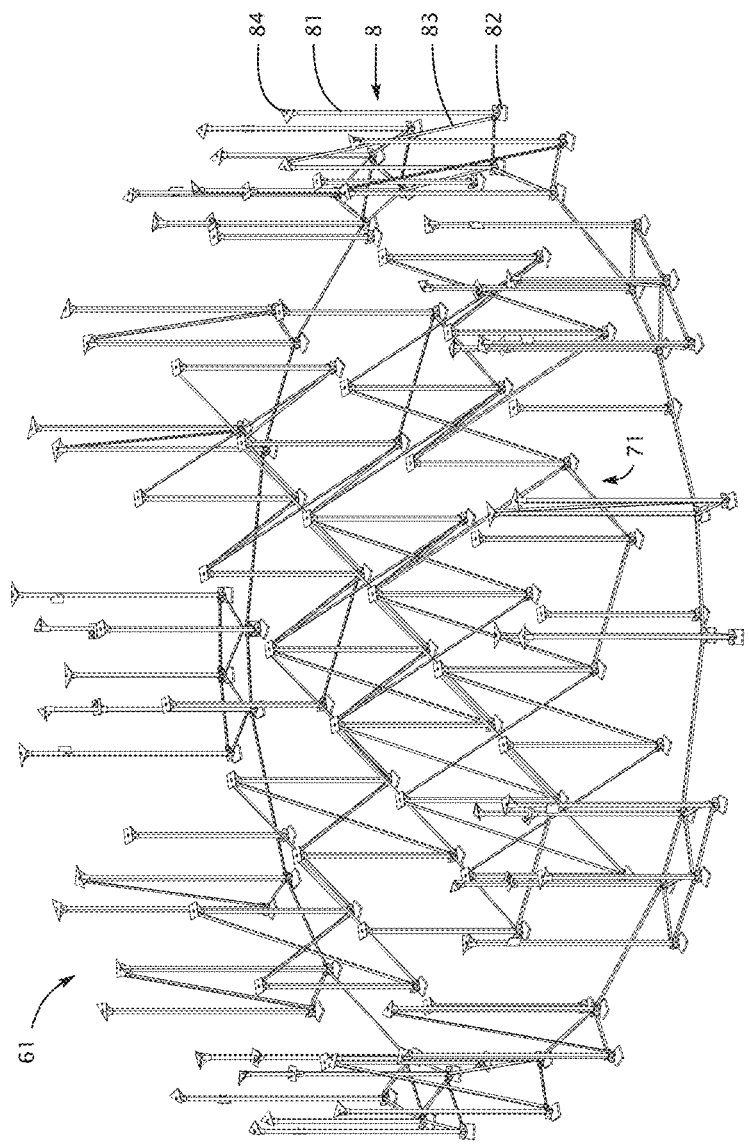
FIG. 1 is a view of the preferred embodiment of a custom foundation ring scaffolding, and a custom interior flooring scaffolding, based on a five-foot grid. All scaffolding is set on screw jacks for assembly on uneven terrain.
Figure 2:
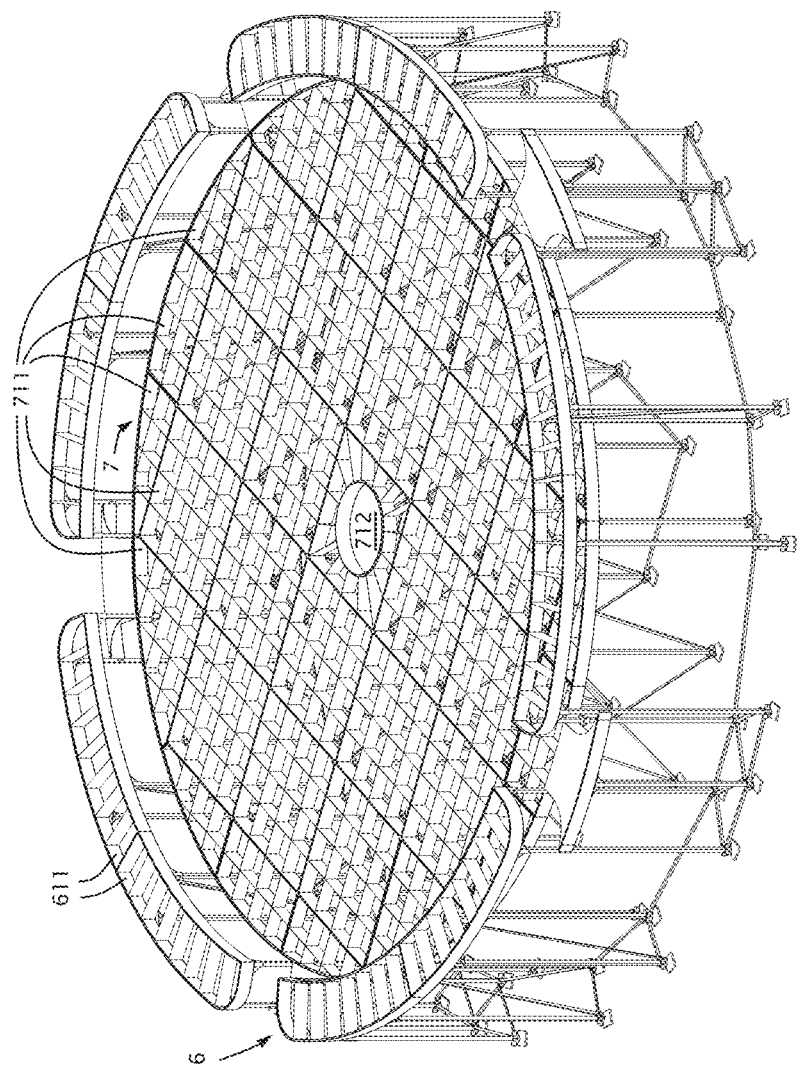
FIG. 2 shows the addition of the preferred embodiment of a custom independent foundation ring of platforms to support the Lotus Dome structural members, and the preferred embodiment of custom interior flooring platforms.
Figure 3:
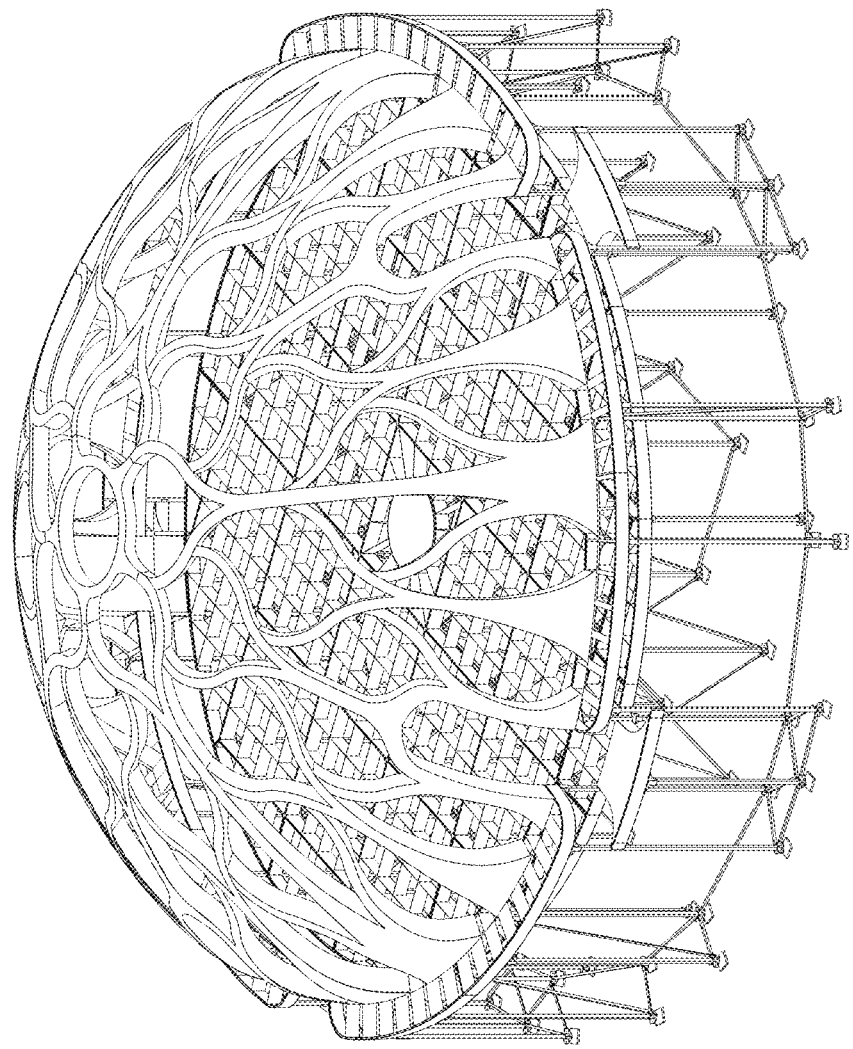
FIG. 3 adds the Lotus Dome structural members (herein called "ribs"). The four rib types are the five Main Ribs, the five Door Ribs, the five mirrored pairs of Support Ribs, and the top Center Ring Rib.
Figure 4:
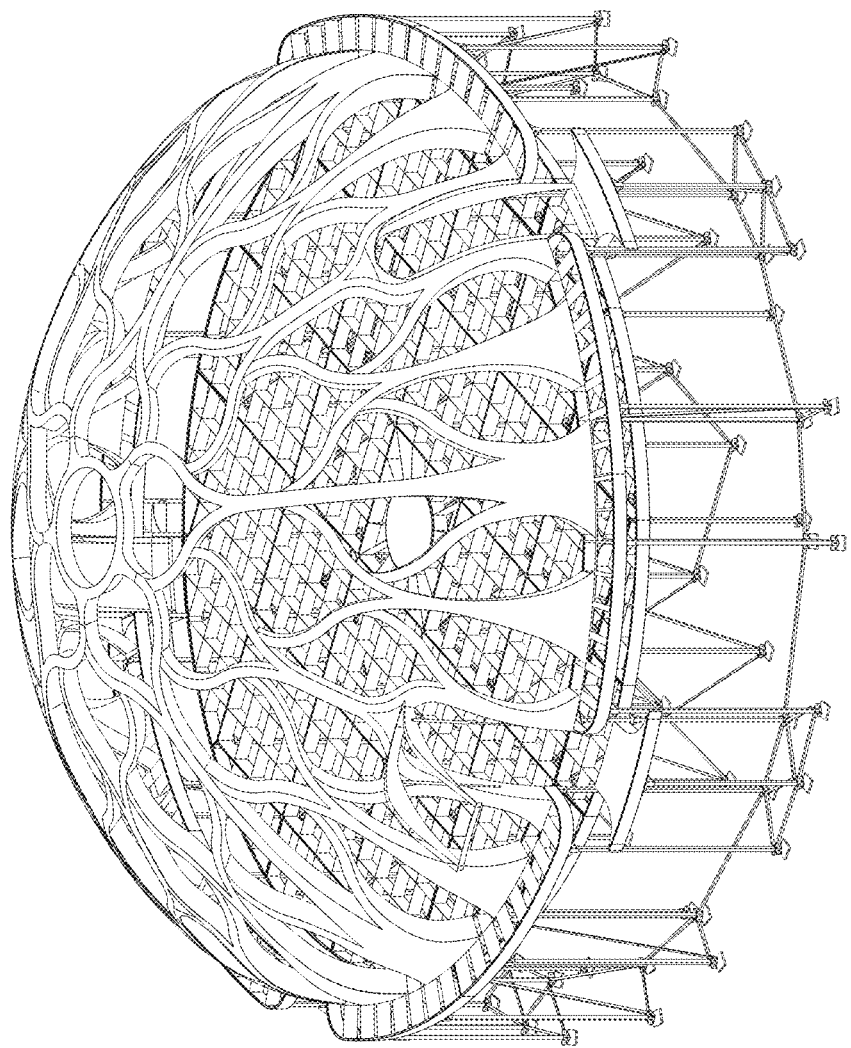
FIG. 4 adds the "gull-wing" doors. One is shown in the open position (lower left), supported by gas struts, the rest are shown closed.
Figure 5:
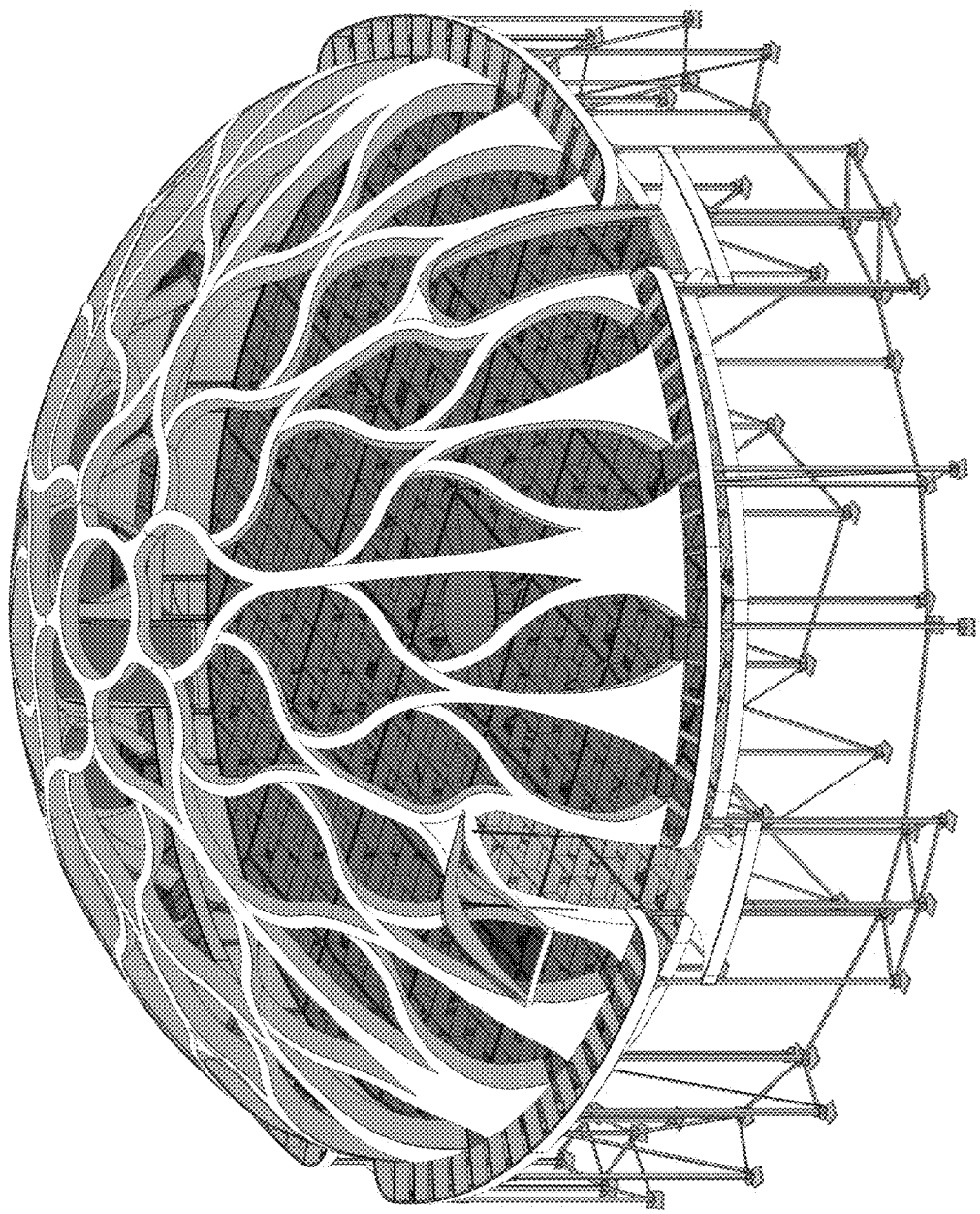
FIG. 5 shows the full Lotus Dome assembly from FIG. 4, as well as the cut sheets of transparent windows, in a grayscale, "shaded" view, to help clarify the combined transparent layers of the windows, the door windows, and the surfaces of the interior flooring platforms and the foundation ring platforms.
Figure 9:
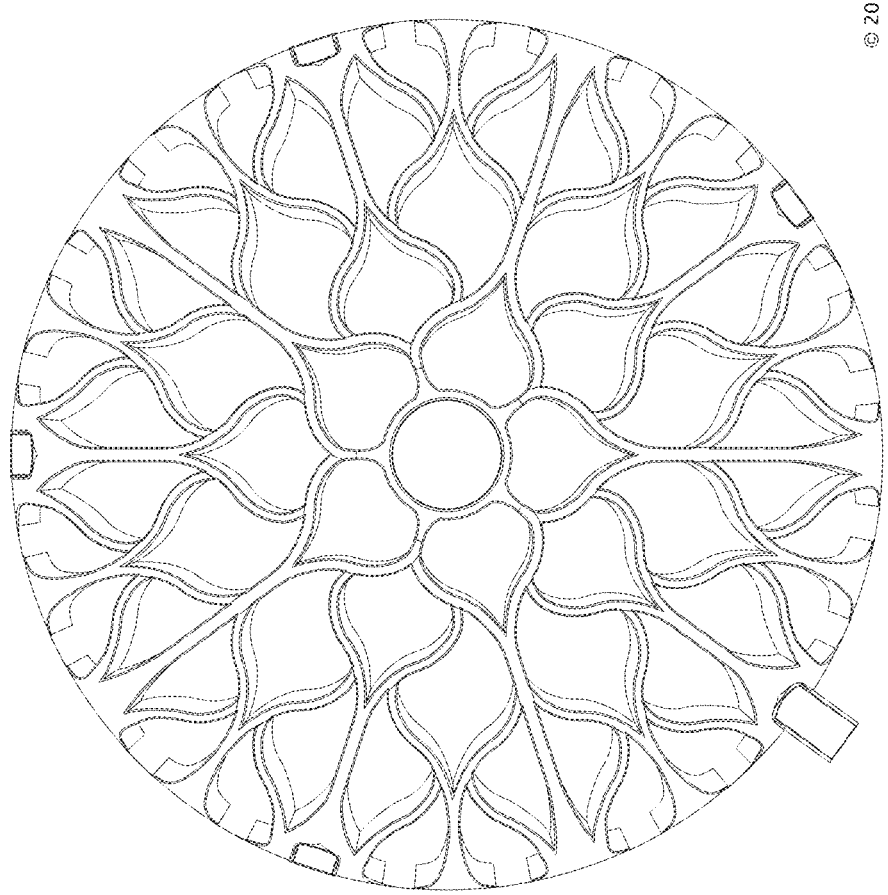
FIG. 9 is a plan view of a ninety-foot diameter Lotus Dome, as demonstrated in FIG. 8.
Figure 10:
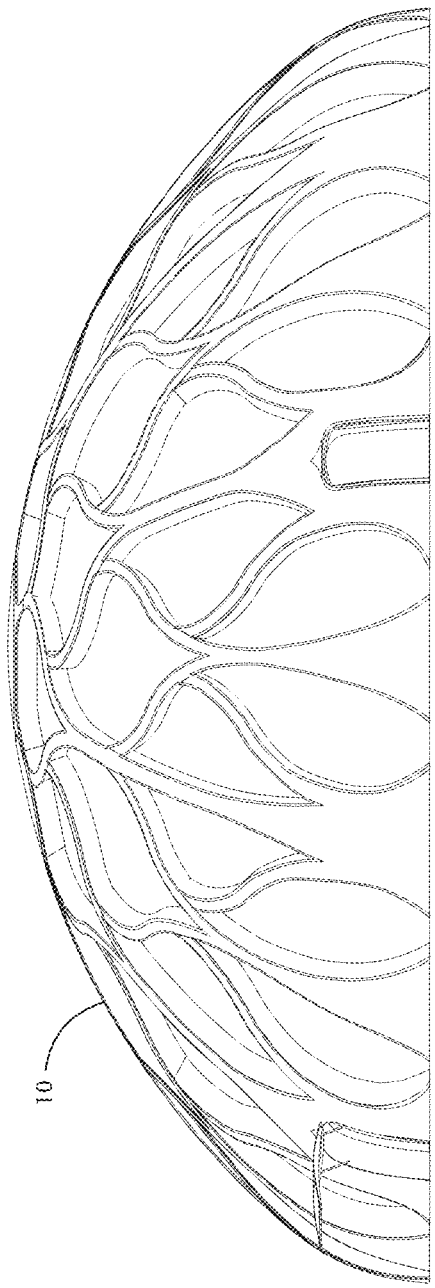
FIG. 10 is a side view of a ninety-foot diameter Lotus Dome, as demonstrated in FIG. 8.

The independent foundation ring scaffolding 61 and the interior flooring scaffolding 71 are shown in FIG. 1. The foundation ring platforms 611 and interior flooring platforms 711 are supported by the foundation ring scaffolding 61 and interior flooring scaffolding 71, respectively, as shown in FIG. 2. The central, Fire Pit platform 712 is shown open in FIG. 2 and covered in FIGS. 3 to 5. In FIGS. 3 to 5, the Lotus Dome is shown secured (see FIG. 7) to the foundation ring 6 surrounding the interior flooring 7. FIG. 5 is shown in a grayscale, "shaded" view, to help clarify the combined transparent layers of the windows 5, the door windows 25, and the independent flooring systems 6 7. The positioning of the windows 5 and the door windows 25, upon the exterior surfaces of the ribs and the doors, is demonstrated in FIGS. 8 to 10. The distinct shapes of the windows 5, including the five sets of mirrored pairs, are designated in FIG. 8.

The Structure and Fabrication of a Rib

The Lotus Dome structural members (herein called "ribs") could also be referred to as trusses or beams, as they serve as such structural elements; "Ribs" is used herein, given their organic shape. The four rib types are the five Main Ribs 1, the five Door Ribs 2, the five mirrored pairs of Support Ribs 3L 3R, and the top Center Ring Rib 4. At any given cross section, each rib is composed of one exterior surface 11 21 31L 31R, two interior structural web members 12 22 32, and any interior rib surfaces 13. It is the interior structural web members, aligned in a vertical orientation, and rigidly secured at near-right angles to the rib's exterior surface(s), and any interior rib surfaces, at each set of independently aligned mating sleeves and mating hardware inserted therein, that provide the primary strength of the ribs.

Figure 25:
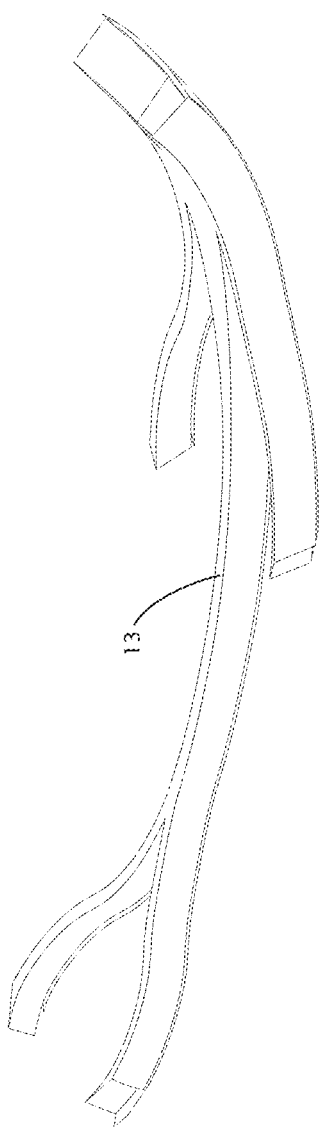
FIG. 25 demonstrates the same fully assembled Main Rib from FIG. 24, with an interior surface secured to the eight structural web members.

The rib exterior surfaces 11 21 31L 31R and rib structural web members 12 22 32 are cut to the desired shapes from sheets of metal (e.g. aluminum or stainless steel), wood, high-density polymer, composite, carbon fiber, or similar materials. Expertise in, and the use of, CAD/CAM software for such machining is highly recommended. An alternate process could be to make templates, from which to rout or cut the rib components. If so desired, an interior surface 13 (FIG. 25) for any of the ribs, secured to the inside edges of the rib's structural web members, could be added for the purpose of enhancing the structural strength and/or functional utility of the rib, and could be fabricated in any form, from a stretched fabric cover, as the rungs of a ladder, a perforated surface, from the same material as the rib exterior surfaces 11 21 31L 31R and rib structural web members 12 22 32, or from any other form of material, or any combination of various materials or forms thereof. Once the rib exterior surfaces 11 21 31L 31R and rib structural web members 12 22 32 have been cut from flat stock, sets of two (or more) lengths of rigid tubing ("sleeves") 101 102 are then secured to the adjoining rib surfaces such that they can be aligned and then locked together with a mating sleeve pin 103. Rods that have been bent into a "U" shape and inserted through three aligned sleeves, as indicated in FIG. 7, are the preferred embodiment. Other forms of bolts, pins, or such hardware as is deemed most appropriate for the intended use, inserted into and/or through each of said now-aligned sets of mating sleeves, may be used, as desired. Any interior rib surfaces 13 may be fabricated in a similar manner.

Welding, molding, or the use of U-shaped bolts are possible methods of securing the mating sleeves to their respective exterior surfaces and structural web member surfaces; welding may well be the most reliable procedure and is the preferred embodiment, as indicated in FIG. 7. The outer two lengths 101 of each set of three lengths of sleeves are secured to the inside of the rib's exterior surface 11 21 31L 31R, and the middle length of tubing 102 is secured to the vertical structural web member's surface 12 22 32. (The middle lengths of tubing 102 may be secured to either the inside or the outside of the vertical web member's surface; this may primarily be an aesthetic decision.) The mating sleeve pin assemblies 100 can be spaced approximately eighteen inches apart, depending upon structural necessity.

Figure 21:
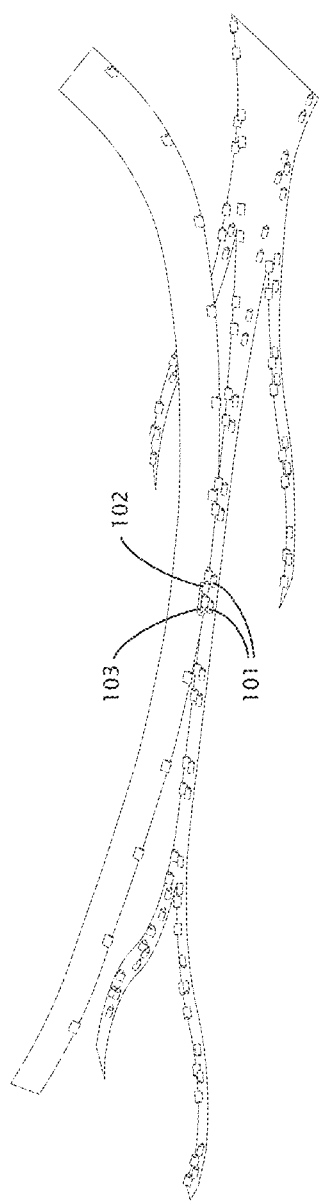
FIG. 21 demonstrates the same exterior surface and structural web member of the Main Rib from FIG. 20, both still as flat surfaces, but with the structural web member rotated ninety degrees above the exterior face, and positioned such that a single mating sleeve pin, through a now-aligned set of mating sleeves, connects the two components at a ninety-degree angle to each other.
Figure 22:
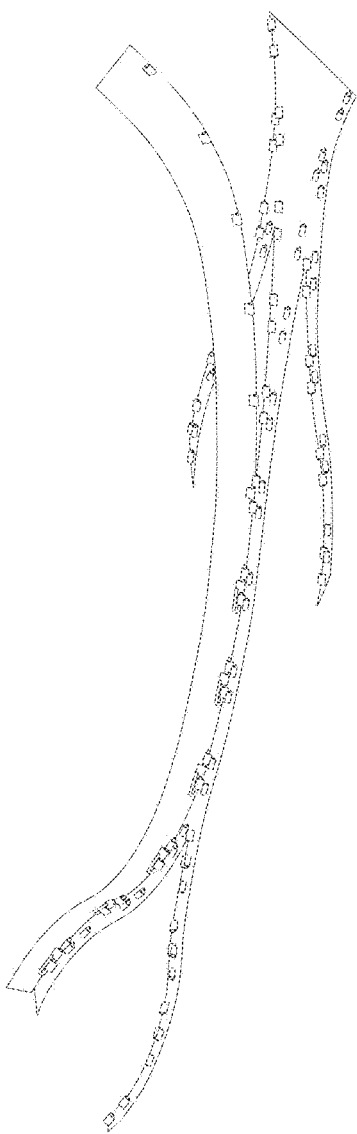
FIG. 22 demonstrates the same exterior surface and structural web member of the Main Rib from FIG. 21, but with the top half of each of the two members forced into curves such that those sets of mating sleeves are aligned and thus able to be pinned together with mating sleeve pins. The bottom half of each of the two members remains a flat surface.
Figure 23:
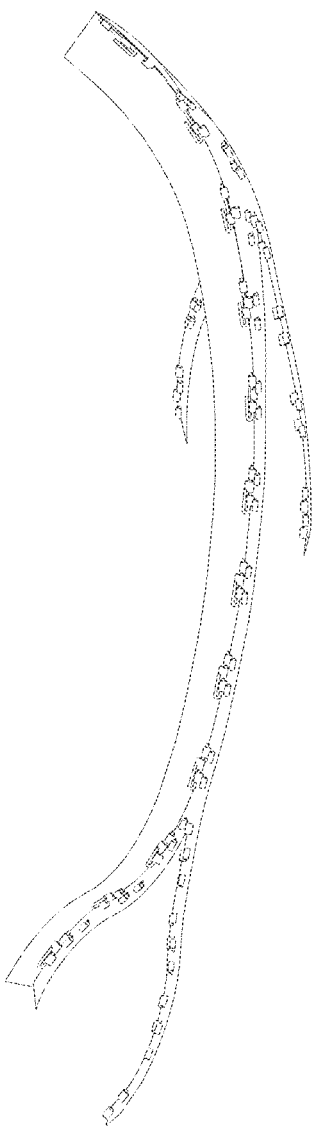
FIG. 23 demonstrates the same exterior surface and structural web member of the Main Rib from FIG. 22, but with the full length of both members forced into curves such that all the common sets of mating sleeves are able to be pinned together.
Figure 24:
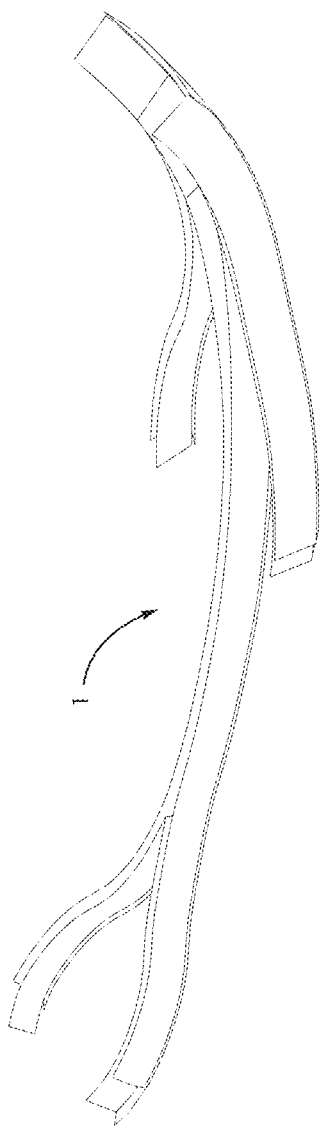
FIG. 24 demonstrates the same exterior surface of the Main Rib from FIG. 23 fully pinned to all eight of its structural web members, ready to be stood upright and secured to the other Lotus Dome ribs and to a foundation.

These lengths of rigid, mating sleeve tubing 101 102, pinned together with a mating sleeve pin 103, create a rigid and secure assembly 100 for locking the adjoining exterior surfaces 11 21 31L 31R and structural web members 12 22 32 together, as the combined assembly 100 of two (or more) sleeves 101 102 and mating sleeve pin 103 creates a secure, inflexible joint due to the conjunction of the curvature of the exterior surface and the curvature of the web member surfaces, as shown in FIGS. 21 to 23.

Because all adjoining exterior surfaces 11 21 31L 31R and structural web members 12 22 32 must be forcibly curved into non-planar shapes, causing each of said related sets of mating sleeves to independently align together in a linear manner to allow them to be quickly and easily pinned together 100, this curving, at various points of the structural web members surfaces, often resulting in one or more of the paired components undulating between being in tension and then being in compression, creates a prestressed structure such that once pinned together 100, there is not only additional strength gained due to the prestressed condition, but the mating sleeve pins 103 will be firmly secured within each of said sets of aligned, enclosing, mating sleeves, due to the friction between the mating sleeve pins 103 and the two (or more) mating sleeves 101 102, given the intrinsic tendency for each component of the pairs of adjoining, now-curved, non-planar exterior surfaces and structural web members to separate and unfold to its inherent, non-stressed, flat state.

Said undulating curvature, resulting in the combination of both tension and compression on each side of the structural web members 12 22 32, over the length of the structural web members, creates an exceptionally rigid, inflexible web member, when pinned to the rib's exterior surface(s) 11 21 31L 31R. As noted above, the addition of cross bars (i.e. "ladder rungs"), a perforated interior surface, or a solid interior surface 13 for any of the ribs, secured to the inside edges of the rib's structural web members 12 22 32, would further enhance the structural strength of the rib, due to the further restriction of any flexing along the inside edge of the vertical web members that any load applied to the rib might impose.

Given the dome shape of the Lotus Dome structure, all sets of mating sleeve pin assemblies 100 will have a vertical orientation, as shown in FIG. 7, and thus inserting the mating sleeve pins 103 from above, and given the force of gravity combined with the inherent friction between the two (or more) mating sleeves 101 102 and the mating sleeve pins 103 inserted therein, as noted above, the mating sleeve pins 103 will be firmly and securely held in place. Being able to quickly and easily pin the undulating, non-planar surfaces together, allows for the rapid assembly of rigid, prestressed structural members that are both much stronger and more secure than structural members assembled using flat surfaces.

This method creates ribs comprised of non-planar, prestressed, structural components that are inherently quite strong, rapidly assembled and disassembled, and easily transported.

The shape, quantity, and configuration of the ribs may be of any combination or configuration, given the wide range of possible uses for such a structure. The preferred embodiment of the Lotus Dome, as shown in this disclosure, is recommended.

The sectional curvature of the Lotus Dome 10 (FIG. 10) as demonstrated by the smooth, curved surfaces of the ribs 1 2 3, the Center Ring Rib 4, and the windows 5, has been designed with an increasingly tighter radius toward the base of the Lotus Dome, to create interior acoustic characteristics such that every member of the audience could hear equally well, without the need for sound amplification. Given that the flat surfaces of the ribs 1 2 3 and the windows 5 (as well as the door windows 25) are curved into shape upon assembly of the Lotus Dome, there would be no seams within those surfaces that would impact the reflection of the sound waves. The lack of planar, flat surfaces means that sound waves will be reflected in gradually increasing degrees of concentration, the further one gets from the center of the Lotus Dome, rather than being reflected along parallel lines due to being reflected off of flat surfaces, which would result in uneven distribution of the reflected sound.

Shipping the Lotus Dome Ribs Once fabricated, the exterior surfaces 11 21 31L 31R, structural web members 12 22 32, and any interior rib surfaces 13, windows 5 25, and doors 23 of each of the ribs 1 2 3L 3R are then able to be stacked upon each other as rigid, nested, flat components, such that the mating sleeves 101 102, secured to each of a rib's exterior surface(s) and its structural web members, can share the same amount of vertical space. The various sets of nested surfaces are then able to be placed beside each other and/or stacked upon each other, to reduce to a bare minimum the amount of space needed for shipping a disassembled Lotus Dome, given that the height of the volume necessary for the shipping of said nested, flat components can be limited to the combined material thickness of said components, including the material height of any hardware mounted thereon. When nested together, the components can be separated by a protective layer of fabric or plastic, to protect the finish of each of the component's surfaces. This use of protective layers has been accounted for in the layering of the exterior surfaces and the structural web members, and the process of stacking such nested components is demonstrated in FIGS. 11 to 19.

Figure 11:
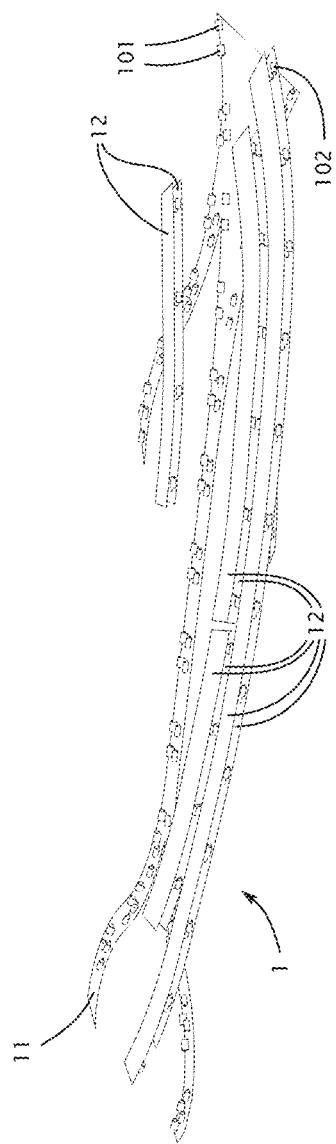
FIG. 11 demonstrates the exterior surface and the eight structural web members of a single Main Rib, lying flat in preparation for shipping.

FIG. 11 demonstrates the exterior surface 11 and the eight structural web members 12 of a single Main Rib 1, lying flat in preparation for shipping. The four pairs of structural web members 12 are nested together such that the mating sleeves 102 secured to each structural web member share the same amount of vertical space. The nested pairs of structural web members 12 are then placed side by side to share the same amount of vertical space, and lie on top of the exterior face 11, between various sets of the exterior face's mating sleeves 101, to again minimize vertical space.

Figure 12:
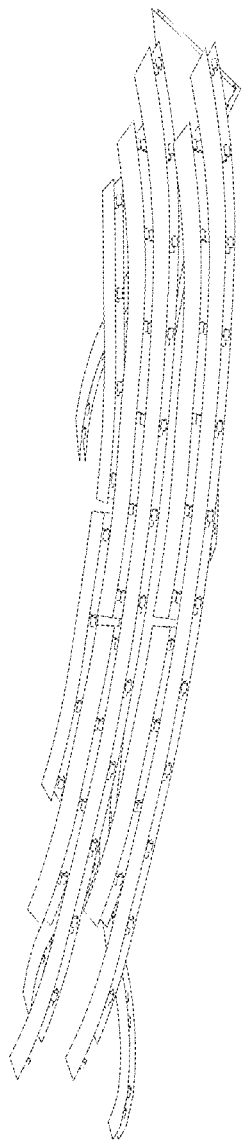
FIG. 12 demonstrates the exterior surfaces and structural web members of a pair of Main Ribs, lying flat and nested together in preparation for shipping.

FIG. 12 demonstrates the exterior surfaces 11 and structural web members 12 of a pair of Main Ribs 1, lying flat and nested together in preparation for shipping. The matching pair of exterior surfaces 11 are nested together such that the mating sleeves 101 secured to each exterior surface share the same amount of vertical space. And again, the nested pairs of structural web members 12 are placed side by side to share the same amount of vertical space.

Figure 13:
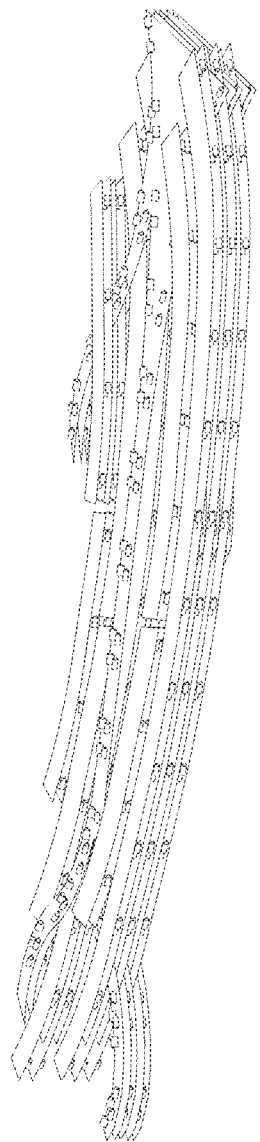
FIG. 13 demonstrates the full set of exterior surfaces and structural web members of all five Main Ribs, nested together in pairs and stacked on top of each other, lying flat in preparation for shipping.

FIG. 13 demonstrates the full set of exterior surfaces 11 and structural web members 12 of all five Main Ribs 1, nested together in two sets of pairs and stacked on top of each other, lying flat in preparation for shipping. The exterior surface 11 and the eight structural web members 12 of the fifth Main Rib 1, as demonstrated in FIG. 11, are shown placed on top off the two sets of pairs of Main Ribs.

Figure 14:
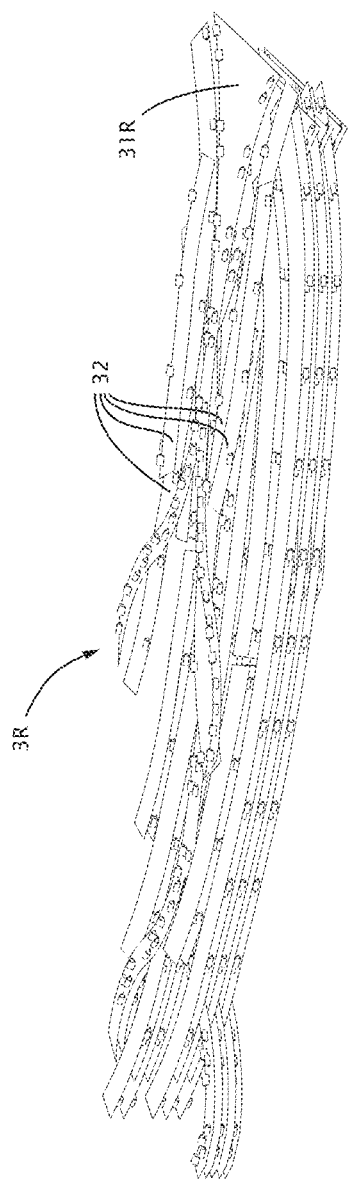
FIG. 14 demonstrates the exterior surface and structural web members of a single Support Rib, lying flat in preparation for shipping, on top of the full set of nested and stacked Main Ribs.

FIG. 14 demonstrates the exterior surface 31R and structural web members 32 of a single Support Rib 3R, lying flat in preparation for shipping, on top of the full set of nested and stacked Main Ribs.

Figure 15:
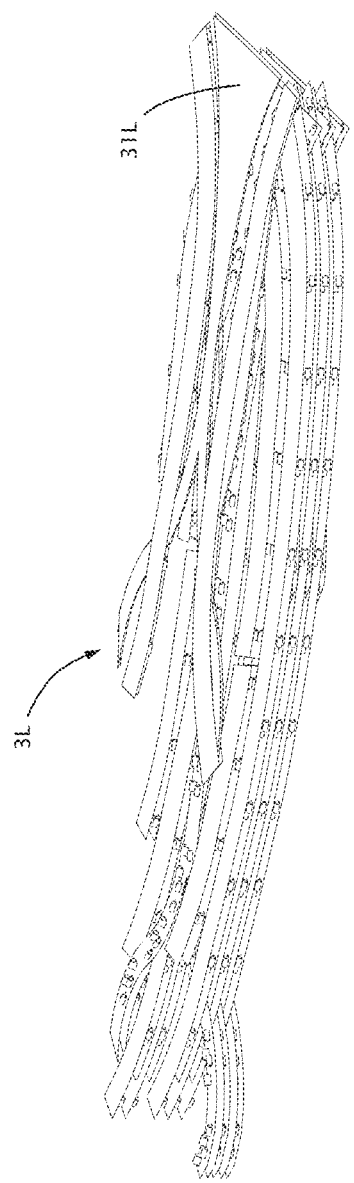
FIG. 15 demonstrates the exterior surfaces and structural web members of a mirrored pair of nested Support Ribs, lying flat in preparation for shipping, on top of the full set of nested and stacked Main Ribs.

FIG. 15 demonstrates the exterior surfaces 31L 31R and structural web members 32 of a mirrored pair of nested Support Ribs 3L 3R, lying flat in preparation for shipping, on top of the full set of nested and stacked Main Ribs.

Figure 16:
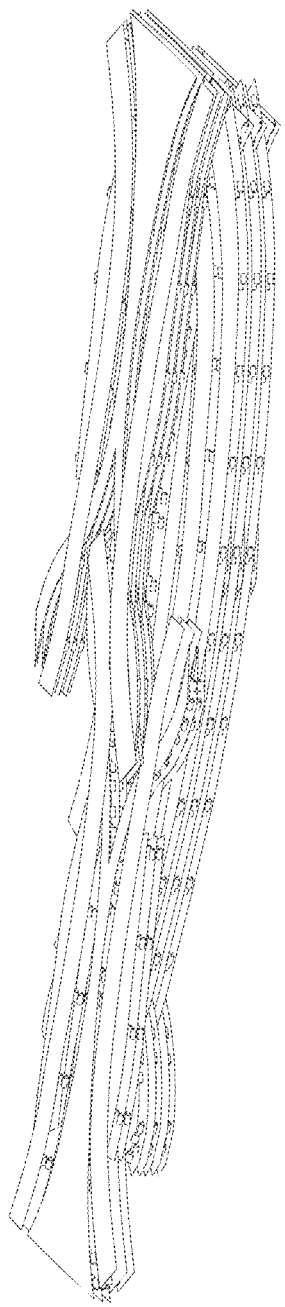
FIG. 16 demonstrates the full set of nested exterior surfaces and structural web members of all ten Support Ribs, lying flat in preparation for shipping, and arranged in two stacks, on top of the full set of nested and stacked Main Ribs.

FIG. 16 demonstrates the full set of nested exterior surfaces 31L 31R and structural web members 32 of all ten Support Ribs 3L 3R, lying flat in preparation for shipping, and arranged in two stacks, on top of the full set of nested and stacked Main Ribs.

Figure 17:
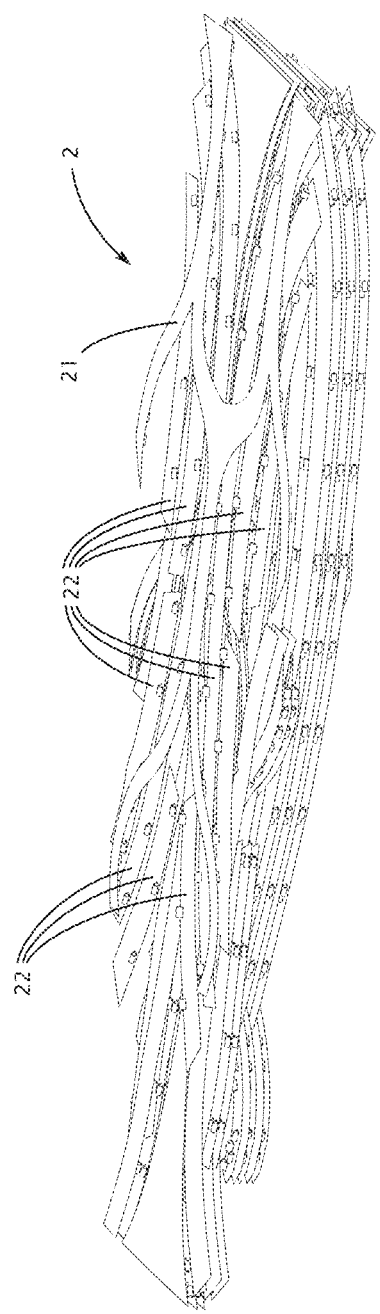
FIG. 17 demonstrates the nested exterior surface and structural web members of a single Door Rib, lying flat in preparation for shipping, on top of the full set of nested and stacked Main Ribs and Support Ribs.

FIG. 17 demonstrates the nested exterior surface 21 and structural web members 22 of a single Door Rib 2, lying flat in preparation for shipping, on top of the full set of nested and stacked Main Ribs and Support Ribs. The structural web members for the Door Rib are arranged side-by-side, with the exterior surface lying on top off the Door Rib structural web members such that the mating sleeves secured to the exterior face 101 share the same amount of vertical space as the sleeves for the Door Rib structural web members 102.

Figure 18:
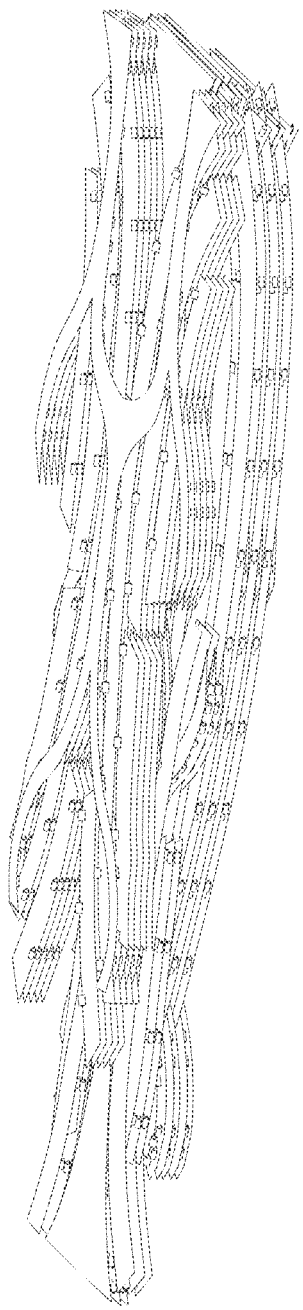
FIG. 18 demonstrates the full set of exterior surfaces and structural web members of all five Door Ribs, lying flat in preparation for shipping, on top of the full set of nested and stacked Main Ribs and Support Ribs.

FIG. 18 demonstrates the full set of exterior surfaces 21 and structural web members 22 of all five Door Ribs 2, lying flat in preparation for shipping, on top of the full set of nested and stacked Main Ribs and Support Ribs. The total height of the full set of nested and stacked Main Ribs, Support Ribs, and Door Ribs, in preparation for shipping, and given ⅛" thick structural surfaces (exterior surfaces and structural web members) and 1" diameter mating sleeve tubings, including space for any sheeting (fabric or plastic) desired to protect the finish on any of the said structural surfaces, would be approximately 19". The surface ("floor") area that said stack would take up is approximately 7'-4"× 20'-3".

Figure 19:
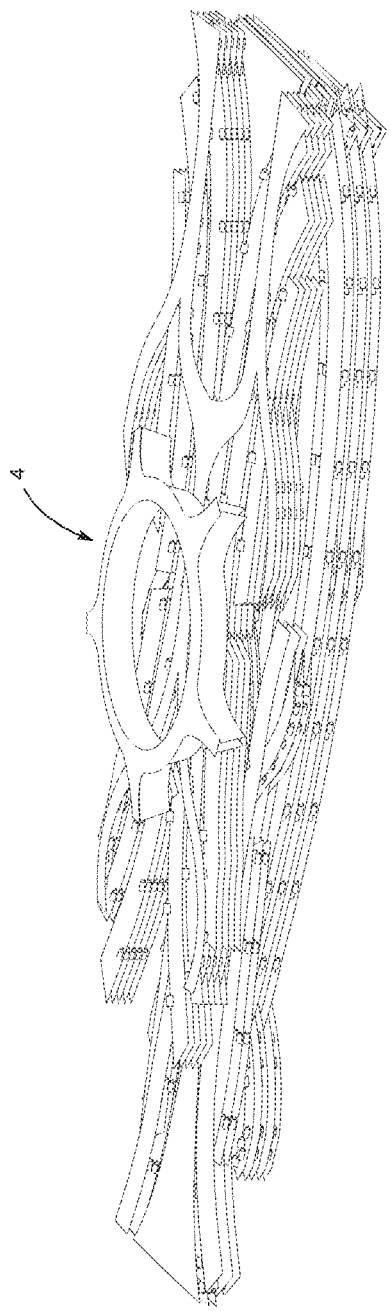
FIG. 19 demonstrates the Center Ring Rib, on top of the full set of nested and stacked Main Ribs, Support Ribs, and Door Ribs. Thus, the entire set of exterior surfaces and structural web members of a Lotus Dome are shown, in preparation for shipping.
Figure 20:
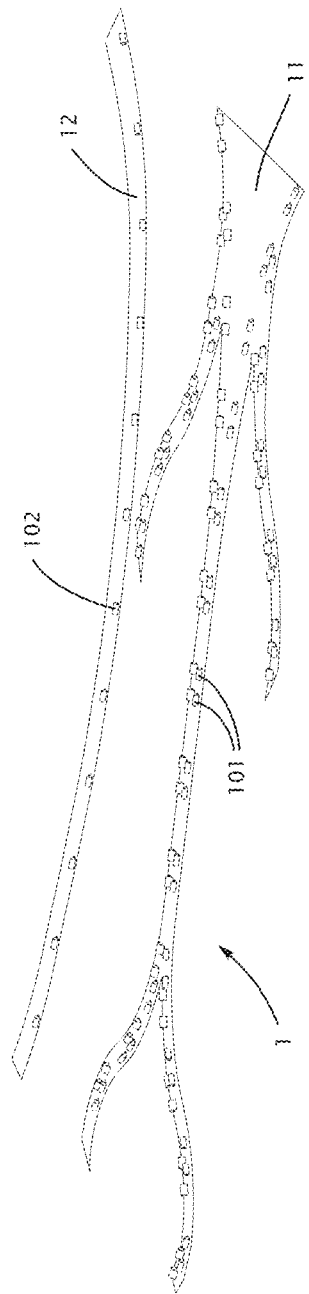
FIG. 20 demonstrates the exterior surface of a Main Rib and one of its structural web members, lying flat alongside each other, prior to assembly.

FIG. 19 demonstrates the Center Ring Rib 4, on top of the full set of nested and stacked Main Ribs, Support Ribs, and Door Ribs. The addition of the Center Ring Rib increases the height of the nested and stacked Main Ribs, Support Ribs, and Door Ribs to approximately 2'-4".

Thus, when un-pinned and laid flat, the compact nature of the full stack of Lotus Dome structural members (exterior surfaces, structural web members, and the Center Ring Rib) demonstrates an unprecedented means of shipping a structure of such high strength, e.g. on a flatbed truck or inside a standard shipping container. The stack of doors 23, and the layers of all the windows 5, separated by protective layers of fabric or plastic, would be equally compact (not shown).

The Assembly of a Rib

As demonstrated in FIGS. 20 to 25, once the Lotus Dome has reached its destination, and is ready to be assembled, each of the multiple flat surfaces of each of the ribs can then be forcibly curved into the proper shape, causing the sets of mating sleeves 101 102 to line up, and be quickly pinned together with mating sleeve pins 103.

Due to the strength of the non-planar, prestressed, structural web members 12 22 32 of the ribs 1 2 3L 3R, as noted above, the Lotus Dome is engineered to allow for the suspension ("rigging") of any elements (e.g.: scenery, and lighting and sound equipment) that might benefit from being suspended above the floor. The strength of each of the rib's structural web members 12 22 32 is determined by both the choice, and the thickness, of the materials used. As noted above, additional strength and/or utility can be gained by adding an interior surface 13 to any or all of the ribs; said interior surface can be of a variety of materials, with full or partial coverage. Because the ribs 1 2 3L 3R 4 are hollow, they are a very convenient and discrete location for electrical wiring and devices, rigging hardware, and storage.

The Doors

"Gull-wing" doors 23 (as shown in FIGS. 4 to 6 and 8 to 10) are fabricated, generally but not necessarily, from the same materials, and secured to the Door Ribs 2 with a horizontal hinge 26 at the top of each door. Any variety of latches, bolts, or pins can be used to secure the doors to the Door Ribs when closed. Gas struts 24 can be used to assist in raising and keeping the doors in an open position and are the preferred embodiment. Other forms of bracing for keeping the doors open to a specific degree are also possible, ranging from flat bars of metal on both sides of each door, to fully automated, electrically controlled motor-driven assemblies. Alternate forms for the doors are also possible and have been considered; the demonstrated gull-wing doors 23 are the preferred embodiment. The doors' windows 25 are sheets of transparent material; polycarbonate is the preferred embodiment, though formed, tempered glass is also possible.

The Windows

Cut sheets of clear polycarbonate serve as windows 5 25, sufficiently overlapping the edges of the exterior surfaces of the ribs 11 21 31L 31R for the purpose of enclosing the space, as demonstrated in FIGS. 3 to 5 and 7 to 10. The windows 5 are bolted 105 to the exterior surfaces of the ribs 11 21 31L 31R 4. Securing the windows 5 to the exterior face of the exterior surfaces of the ribs 11 21 31L 31R 4, as opposed to the interior face of the exterior surfaces of the ribs, is the preferred embodiment, for the purpose of minimizing leaks.

One or more rows of gasket material 51 compatible with polycarbonate (or with whatever material for the windows is chosen) is used between the windows 5 and the exterior surfaces of the ribs 11 21 31L 31R 4 to seal the edges of the polycarbonate windows 5 against the ribs' exterior surfaces 11 21 31L 31R 4. Bolts 105, clevis pins with hitch pin clips, or equivalent hardware, located between the two rows of gasket material 51, as demonstrated in FIG. 7, is the preferred means for securing the polycarbonate windows 5 to said exterior surfaces.

Other transparent materials may be used in place of polycarbonate, although, at this time, polycarbonate is the preferred embodiment for the windows 5 25, due to its ability to be forced into a curved shape and its high degree of durability. Sheets of abrasion-resistant, clear polycarbonate are also the preferred embodiment for the surfaces of the foundation ring platforms 611 and interior flooring platforms 711, as demonstrated in FIGS. 2 to 5, due to said durability, the ability to minimize scuff marks on the floor, and for providing the ability to allow sunlight to pass through the platforms to any plant life or surface below.

The Scaffolding and the Platforming

The foundation ring 6 (FIG. 2) consists of the foundation ring scaffolding 61 (FIG. 1), supporting the foundation ring platforms 611 (FIG. 2) and is the structure to which the Lotus Dome ribs 1 2 3L 3R are secured (FIGS. 3 to 5 and FIG. 7).

Located inside the foundation ring 6 is the interior flooring 7 (FIG. 2), consisting of the interior flooring scaffolding 71 (FIG. 1) supporting the interior flooring platforms 711 (FIG. 2) including the Fire Pit platform 712.

The scaffolding column assemblies 8 (FIG. 1) that make up the foundation ring scaffolding 61 and the interior flooring scaffolding 71 can be made of aluminum, stainless steel, high-density polymer, or any sufficiently strong square, rectangular, or round stock or tubing. Square tubing, as shown in FIGS. 1 to 5, is the preferred embodiment. Each scaffolding column 81 (FIG. 1) is set on a screw jack 82 that is inserted into the bottom of the scaffolding column 81, for the purpose of assembly on uneven terrain. Each scaffolding column 81 is braced to adjacent scaffolding column assemblies 8 with one or more cross braces 83, and secured to the foundation ring platforms 611 (FIG. 2) and interior flooring platforms 711 with scaffolding column platform mounting plates 84 (FIG. 1).

The foundation ring platforms 611 (FIG. 2), the interior flooring platforms 711 and the Fire Pit platform 712 are framed in rectangular tubing. The interior flooring platforms 711 are capable of serving as independent, water storage tanks for radiant-floor heating, and/or aquaponics, if so desired, and can be heated with any combination of sources, including, but not limited to, electrical heating, propane, and/or solar water heaters. The central, Fire Pit platform 712 contains a cavity (shown with its cover removed in FIG. 2 and with its cover in place in FIGS. 3 to 5) for one or more heating elements, fueled by propane, wood, and/or any reliably safe fuel, that can be used for both comfort and ceremonial purposes. The preferred embodiment of the surfaces of the various platforms, as noted above and as shown in FIGS. 2 to 5, is abrasion-resistant, clear polycarbonate to allow sunlight to pass through.

Erecting and Securing a Lotus Dome

The ribs 1 2 3L 3R 4 are secured to each other and/or to the foundation ring platforms 611, with either bolts and nuts 105, clevis pins with hitch pin clips, or other such fasteners, going through mounting plates 104 that overlap the pieces being joined (FIG. 7). Mounting said plates inside the ribs, and thus hidden from view, is the preferred embodiment. FIGS. 3 to 6, and 8 to 10, demonstrate the result of such hidden mounting plates. FIG. 6 demonstrates the junctions between a Main Rib and a Door Rib 1122, the junctions between a Main Rib and a Support Rib 1133, and the junctions between a Door Rib and a Support Rib 2233.

The Lotus Dome may be secured (FIG. 7) to any variety of permanent or non-permanent foundations. All or part of a Lotus Dome could be used as an entrance hall and/or embedded into or against a natural landform or another structure. The foundation ring 6 and interior flooring 7 assemblies are the preferred embodiment that allows the Lotus Dome to be assembled above the ground such that little or no impact is affected upon the ground. "Zero impact" is the preferred embodiment of the Lotus Dome.

The Infrastructure

Ventilation is provided through one or more of the Door Rib doors 23 (removable mosquito-netting is a preferred embodiment), and/or by the opening of, or ventilating through, the window 5 of the Center Ring Rib 4. Additional venting can also be accomplished through other means, including the use of one or more fans to draw air down from the top of the Lotus Dome, via the inside of one or more of the ribs, and exhausting said air outside of the Lotus Dome.

The above preferred embodiments do not, in fact, encompass the entire invention. There are several alternatives and uses for which the Lotus Dome structure can be elaborated, including, but not limited to:

Electrochromic and/or thermochromic films (or equivalent) can be applied to any of the window 5 25 surfaces to control opacity, light transmission, and solar heat gain. Alternate forms of opaque surfaces, or fabrics, can also be used in lieu of, or in addition to, transparent materials in those components and/or locations where such might be preferred.

Capable of being fabricated entirely from non-combustible materials, the Lotus Dome could then be used to safely present indoor pyrotechnic displays.

A radiant-floor heating system can be incorporated into the foundation ring platforming 611 and interior flooring platforming 711, including the Fire Pit platform 712, making it possible to keep those within the Lotus Dome comfortably protected from inclement weather, while still having only a single layer of material for each of the windows 5 25. Such a system could be portable and/or permanent.

Given these specifications, the Lotus Dome can be manufactured and utilized by those reasonably skilled in the pertinent arts.

I claim:

1. A method of fabricating and erecting a dome-shaped structure, comprising the steps of:
(a) cutting a plurality of components of said structure's structural members, as well as any windows and doors, to the desired shapes from sheets selected from a group comprising: metal, plastic, wood, and composite materials;
(b) securing sets of two or more lengths of tubing to the adjoining surfaces of said components in a manner that results in each of said sets of tubing becoming linearly aligned, when the adjoining surfaces of pairs of said components are curved together;
(c) shipping said components, and any windows and doors, as flat, nested surfaces in a manner that reduces the spatial shipping volume required to a minimum;
(d) curving said components, thus causing the related sets of tubing to align in a linear manner, such that they can be pinned together;
(e) pinning each set of said components together to form rigid, prestressed, three-dimensional, load-bearing trusses;
(f) securing said trusses together to form the framework of a rigid, freestanding structure.

* * * * *